United States Patent [19]

Shrier et al.

[11] 3,856,921

[45] Dec. 24, 1974

[54] PROMOTING SCRUBBING OF ACID GASES

[75] Inventors: Adam L. Shrier, Montclair, N.J.; Peter V. Danckwerts, Cambridge, England

[73] Assignee: Exxon Research and Engineering Company, Linden, N.J.

[22] Filed: Nov. 10, 1971

[21] Appl. No.: 197,370

Related U.S. Application Data

[63] Continuation-in-part of Ser. No. 057,303, July 22, 1970, abandoned.

[52] U.S. Cl.............. 423/228, 423/229, 423/236, 423/240, 423/243, 423/245, 208/207
[51] Int. Cl............................................. B01d 53/34
[58] Field of Search ........... 423/226, 228, 229, 240, 423/242, 243, 235, 245, 232–234; 208/207, 289, 331

[56] References Cited
UNITED STATES PATENTS 3,144,301   8/1964   Mayland ............................. 423/229
3,563,695   2/1971   Benson ............................... 423/229
3,637,345   1/1972   Leder.................................. 423/228
3,685,960   8/1972   Benson ............................... 423/119

FOREIGN PATENTS OR APPLICATIONS 1,063,517   3/1967   Great Britain...................... 423/229

Primary Examiner—Earl C. Thomas
Attorney, Agent, or Firm—R. J. Baran

[57] ABSTRACT

Acidic components are removed from fluids by contacting said fluid with a solution of a basic salt of an alkali or alkaline earth metal and an amine selected from the group consisting of 2-methylaminoethanol, 2-ethylaminoethanol, morpholine, pyrrolidone and derivatives thereof. Preferably, the fluid is a gas and the acidic components are selected from the group consisting of $CO_2$ and COS.

9 Claims, No Drawings

PROMOTING SCRUBBING OF ACID GASES

CROSS REFERENCE TO RELATED APPLICATIONS

The instant application is a continuation-in-part of U.S. application Ser. No. 57,303, filed July 22, 1970, in the names of A. L. Shrier and P. V. Danckwerts and now abandoned.

BACKGROUND OF THE INVENTION

1. Field of the Invention

This invention relates to an improved method for removing acidic gases from fluids containing them and more particularly relates to a method for increasing the rate of reaction of basic aqueous solutions with acidic gases, such as $CO_2$, $H_2S$, COS, $SO_2$, $SO_3$, $CS_2$, HCN, HCl, COS and the oxygen and sulfur derivatives of $C_1$ to $C_4$ hydrocarbons.

2. Description of the Prior Art

Prior to the present invention, it has been known to treat gases and liquids, such as mixtures of gases including carbon dioxide and hydrogen sulfide, and hydrogen, nitrogen, carbon monoxide and light hydrocarbons, such as butane, propane ethane, methane and the like, with amine solutions such as monoethanolamine, diethanolamine, and triethanolamine to remove acidic gases, such as carbon dioxide and hydrogen sulfide. The amine usually contacts gases and liquids as an aqueous solution containing approximately from 10 wt. to 30 wt. % of the particular amine in an absorber tower with the aqueous amine solution contacting the acidic fluid countercurrently.

It is also known, as described in U.S. Pat. No. 3,144,301, issued Aug. 11, 1964, to Mayland, to remove $CO_2$ from gaseous mixtures by contacting said gases with potassium carbonate solutions containing 0.5 to 2 wt. % of monoethanolamine or diethanolamine. A similar disclosure is found in the British Patent No. 1,063,517, published Mar. 30, 1967, for Eickmeyer in which not only monoethanolamine and diethanolamine, but also triethanolamine, ethylenediamine, the reaction product of triethanolamine and ethylene oxide, diethylenetriamine, triethylenetetramine, tetraethylenepentamine, dihydroxyethyl ethylene diamine, trihydroxyethyl ethylenediamine, and trihydroxyethyl diethylenetriamine are disclosed as being added in small amounts of $K_2CO_3$ solutions for absorbing $CO_2$ and $H_2S$ from gases.

While small amounts of monoethanolamine and diethanolamine when added to $K_2CO_3$ solutions have given satisfactory absorption rates for removing $CO_2$ from gases, improvements are still being sought. Furthermore, the alkylolamines used in commercial installations, particularly monoethanolamine, give rise to corrosion problems.

SUMMARY OF THE INVENTION

In a process for the removal of acidic components from fluids containing them, wherein said fluids are contacted with a solution of a basic salt of an alkali or alkaline earth metal, an improved result is unexpectedly obtained by contacting said fluids with said solution in the presence of an amine selected from the group consisting of 2-methylaminoethanol, 2-ethylaminoethanol, morpholine, pyrrolidine, and derivatives thereof. Said fluid may be either gaseous or liquid or mixtures thereof. Fluids which may be treated by the instant process include natural gas, manufactured fuel gases, synthesis gases from ammonia or hydrogen manufacture, and liquid hydrocarbons derived from fossil fuels, such as LPG, gasoline, naphtha and kerosene.

The acidic components generally found in fluids capable of treatment by the process of the instant invention include $H_2S$, $CO_2$, $SO_2$, $SO_3$, $CS_2$, HCN, HCl, COS and the acidic oxygen and sulfide derivatives of the lower hydrocarbons, preferably the $C_1$ to $C_4$ hydrocarbons. By acidic components, it is meant those compounds which will react with the basic alkali and alkaline earth metal salts and/or the amines of the instant invention.

The process of the instant invention is especially contemplated for the removal of $H_2S$, $CO_2$ and COS. Most preferably the fluid is a gas, and the acidic components to be removed are $CO_2$, COS, and mixtures thereof.

The solution utilized in the process of the instant invention is preferably aqueous and contains at least about 2% by weight of a basic alkali or alkaline earth metal salt. The amount of salt that may be effectively used varies up to saturation at whatever conditions are utilized in the process, i.e. temperature, pressure, solubility characteristics of said salt in the presence of the amine. Preferably said solution comprises from about 5 to 40% by weight of a basic alkali or alkaline earth metal salt, with from about 10 to 35% by weight most preferred.

The basic alkali and alkaline earth metal salts are selected from the group consisting of carbonates, bicarbonates, hydroxides, borates, and phosphates of lithium, sodium, potassium, calcium, magnesium, and mixtures thereof.

Preferably the basic salt is selected from the group consisting of carbonates, bicarbonates, hydroxides, and borates of sodium and potassium, and mixtures thereof, and more preferably from the group consisting of $K_2CO_3$, $KHCO_3$, $Na_2CO_3$, and $NaHCO_3$, and mixtures thereof. The most preferred salts for use in the instant process are $K_2CO_3$ and $KHCO_3$.

The solution utilized in the process of the instant invention will generally contain from about 0.5 to 20% by weight of the aforementioned amines. Preferably 1 to 5 weight % of said amines are utilized. As stated previously, the amines are selected from the group consisting of 2-methylaminoethanol, 2-ethylaminoethanol, morpholine, pyrrolidine, and derivatives thereof. More particularly, said derivatives are the hydrocarbyl derivatives, preferably the lower alkyl derivatives of the aforementioned amines. By lower alkyl derivative, it is meant $C_1$ to $C_3$ alkyl. Preferably, the amines utilized are selected from the group consisting of 2-methylaminoethanol, 2-ethylaminoethanol, morpholine, and pyrrolidine. Most preferably, the amine will be 2-ethylaminoethanol. It should be pointed out that when utilizing morpholine in the process of the instant invention further advantages are obtained in that morpholine is known as a corrosion inhibitor. In processes where corrosion is a problem, morpholine would thus be the chosen amine and would give improved performance when compared to the amines known to be used in the prior art, i.e., monoethanolamine, diethanolamine, etc. In general, the instant process is carried out in contacting towers which are characterized as having trays or packing to insure intimate contacting between the fluid and the solution. Design of specific contacting towers for specific removal processes is within the skill of the ordinary skilled artisan. Best results are usually obtained when said contacting is countercurrent.

The contacting of said fluid and said solution can be done at any temperature at which said solution remains a liquid and is sufficiently fluid to obtain sufficient rate of removal of acidic components contained in said fluid. On the other hand, an upper temperature limitation would be that temperature at which there is no great loss of solution due to vaporization. In general, said contacting will take place at a temperature of from about 20° to 200°C, preferably 30° to 175°C, and most preferably 35° to 150°C.

The pressure can also vary in the instant process. Generally, however, it will be between 5 and 2,000 pounds per square inch. Preferably the pressure is within 100 and 1,500 psi, and most preferably between 200 and 1,000 psi.

A further improvement in the instant process results from the addition of a hydration catalyst to said solution. Hydration catalysts are selected from the group consisting of $As(OH)_3$, $Ge(OH)_4$, $HOCl$, $H_3BO_3$, $HCHO$, $H_2SO_3$, and will comprise from 0.5 to 5.0 moles catalyst/moleamine, preferably 1.0 to 3.0 moles catalyst/mole amine. The most preferred hydration catalyst is $H_3BO_3$, and preferably a ratio of from 0.5 to 5.0 moles boric acid/mole amine of said most preferred hydration catalyst will be used.

Although it is not intended to be bound by any theory, it is believed that increased rates of removal of acidic components from fluids wherein they are contained are achieved by utilization of the amines of the instant process along with the aforenamed hydration catalysts. Further improvements obtained by use of the process of the instant invention include increased bulk equilibration and desorption rate.

The following are preferred embodiments of the instant invention.

EXAMPLE 1

Three different absorption solutions containing varying ratios of potassium bicarbonate and potassium carbonate were made up as references. Solution I was made by dissolving 138 grams of potassium carbonate and 100 grams of potassium bicarbonate in 1,000 milliliters of water. Solution II was made by dissolving 138 grams of potassium carbonate and 100 grams of potassium bicarbonate in 2,000 milliliters of water. Solution III was made by dissolving 88 grams of potassium carbonate and 16 grams of potassium bicarbonate in 1,000 milliliters of water. The three solutions had the properties given in the table below.

TABLE I

COMPOSITION AND PROPERTIES OF ABSORPTION SOLUTIONS

| | | Solution | | |
|---|---|---|---|---|
| | | I | II | III |
| Ratio, $r_o = \frac{[HCO_3^-]_o}{[CO_3^=]_o}$ | | 1 | 1 | 0.25 |
| Ionic Strength, I | | 4 | 2 | 4.16 |
| pH(20°) | | 9.86 | 9.78 | 10.54 |
| Density, g/ml (20°) | | 1.16 | 1.10 | 1.16 |
| Relative Viscosity | 18°C: | 1.57 | 1.24 | 1.54 |
| | 25°C: | 1.58 | 1.27 | 1.57 |
| $CO_2$ Solubility, $C^{*(b)}$ | | | | |

TABLE I—Continued

COMPOSITION AND PROPERTIES OF ABSORPTION SOLUTIONS

| | | Solution | | |
|---|---|---|---|---|
| | | I | II | III |
| mole/l$^{(a)}$ | 18°C: | 0.0226 | 0.0304 | 0.0222 |
| (Sat'd. vapor, 1 atm) | 25°C: | 0.0187 | 0.0250 | 0.0183 |

$^{(a)}$Estimated according to Nysing and Kramers Chemical Engineering Science, v. 8, pages 81-89 (1958),(extrapolated to higher values of I).
$^{(b)}$Solubility of $CO_2$ in the liquid phase.

The $CO_2$ absorption rate was then determined for the potash solution above and the cell evacuated. The amount of amine required to make a 0.1 molar solution was added (typically about 1 ml) and the rate again determined. The ratio of the two rates was calculated and the results in Table II were obtained. The solutions were stirred at about 105 rpm. A water saturated $CO_2$ gas stream was contacted with said solution at a temperature of 18°C and 1 atmosphere. The following results were obtained.

TABLE II

| Absorption Solution | Amine | Absorption Rate (a) |
|---|---|---|
| I | 2-ethylaminoethanol (EAE) | 1.93 |
| | 2-methylaminoethanol (MAE) | 1.46 |
| | pyrrolidine | 1.37 |
| | morpholine | 1.28 |
| | ammonia | 1.25 |
| | 2,6-dimethylmorpholine (DMM) | 1.22 |
| | monoethanolamine (MEA) | 1.20 |
| | monoisopropanolamine (MIPA) | 1.11 |
| | ethylenediamine | 1.09 |
| | hydrazine | 1.03 |
| II | EAE | 1.84 |
| | MAE | 1.59 |
| | DEA | 1.25 |
| | MEA | 1.20 |
| | benzylamine | 1.16 |
| | glycine | 1.09 |

(a) Absorption rate for amine-promoted solution relative to the absorption rate for unmodified potash absorption in the same solution at the same conditions.

The above data show that 2-ethylaminoethanol, 2-methyl-aminoethanol, pyrrolidine and morpholine were very effective with 2-ethylaminoethanol being outstanding.

EXAMPLE 2

To the buffer solution III of Example 1 was added various amounts of 2-ethylaminoethanol at atmospheric and reduced pressures. The results are set forth in the following table.

TABLE III $CO_2$ ABSORPTION INTO EAE-PROMOTED POTASH SOLUTIONS
Solution III
Temperature: 25°C

| System Pressure(b) | (Amine) mole/l | RPM | Absorption Rate(a) |
|---|---|---|---|
| 1 atm. | 0.047 | 105 | 1.39 |
| | | 78 | 1.20 |
| | 0.092 | 105 | 2.00 |
| | | 78 | 1.45 |
| | 0.139 | 105 | 2.02 |
| | | 78 | 1.65 |
| | 0.185 | 105 | 2.36 |
| | | 78 | 1.82 |
| 75 mm | 0.047 | 105 | 3.26 |
| | | 127 | 4.24 |
| | 0.092 | 105 | 4.62 |

TABLE III—Continued

CO₂ ABSORPTION INTO EAE-PROMOTED POTASH SOLUTIONS
Solution III
Temperature: 25°C

| System Pressure(b) | (Amine) mole/l | RPM | Absorption Rate(a) |
|---|---|---|---|
| | | 127 | 5.88 |
| | 0.139 | 105 | 5.43 |
| | | 127 | 7.15 |
| | 0.185 | 105 | 6.63 |
| | | 127 | 8.85 |

(a) Absorption rate for amine-promoted solution relative to absorption rate for unmodified potash solution at the same conditions.
(b) System Pressure = $P = P_{CO} + P_{H_2O}$ The above data show that when higher concentrations of 2-ethylaminoethanol are used at less than atmospheric pressure and at high degree of contact, as determined by increasing the stirrer speed, the rate of absorption increases.

EXAMPLE 3

Carbon dioxide at 780 mm total pressure was absorbed in a stirred vessel, containing potassium carbonate-bicarbonate solutions. The strength of said solution was 1 mole/liter $K_2CO_3$ and 1 mole/liter $KHCO_3$. To this solution the amine under study was added. Absorption rates were measured as the difference between the gas flow in and the gas flow out of the vessel. Measurements were taken by capillary constriction flow meter.

The vessel was stirred by a 6-blade turbine, approximately two inches below the surface, at 150 rpm. The absorption rates of the buffered solutions promoted by several amines, divided by the absorption rate of the buffer alone, measured at the start of the run when the $CO_3^=/HCO_3^-$ ratio is one, are shown in the table below and compared with that of a commercial promoted $K_2CO_3$ solution.

TABLE IV

ABSORPTION RATE IN HOT CARBONATE IS ENHANCED BY PRIMARY AND SECONDARY AMINES

| | 2.5 wt. % Amine | 4.3 wt. % Amine |
|---|---|---|
| Buffer alone | 1.00 | 1.00 |
| EAE | 2.45 | 3.30 |
| MAE | 2.35 | — |
| Morpholine | 1.98 | — |
| DEA | 2.08 | — |
| EDA | 2.05 | — |
| Catacarb | 1.55 | 2.0 |

EAE — 2-ethylaminoethanol
MAE — 2-methylaminoethanol
DEA — diethanolamine
EDA — ethylenediamine
Catacarb — commercial available promoter for carbonate scrubbing solutions The above data clearly show that 2-ethylaminoethanol and 2-methylaminoethanol are clearly superior to the commercial promoted $K_2CO_3$ solution. 2-Ethylaminoethanol is shown to be the most effective on a molar basis. 2-Methylaminoethanol is slightly more effective on a weight basis because of its lower molecular weight.

EXAMPLE 4

An absorption solution containing 1 mole $K_2CO_3$ and 1 mole $KHCO_3$ and 7% by weight ethylaminethanol (EAE) was evaluated for the rate of absorption of COS, and compared to the "Catacarb" solution described above.

The experiment was run at 80°C and 775–800 mm Hg total pressure while stirring at 150 rpm. The results are as follows.

TABLE V

| Time of Absorption (minutes) | Absorption Rate (moles/hour) "Catacarb" | EAE |
|---|---|---|
| 2 | .40 | .85 |
| 4 | .25 | .80 |
| 6 | .10 | .78 |
| 8 | .08 | .76 |
| 10 | .06 | .76 |
| 15 | .04 | .74 |
| 20 | .02 | .70 |
| 25 | .00 | .68 |
| 40 | — | .64 |
| 50 | — | .62 |
| 60 | — | .61 |
| 80 | — | .50 |
| 90 | — | .48 |
| 120 | — | .38 |
| 140 | — | .30 |
| 160 | — | .20 |
| 180 | — | .15 |

The above results show that EAE–$K_2CO_3$ is an improved system for the absorption of COS when compared to the commercial "Catacarb" system. Both rate and capacity are superior.

What is claimed is:

1. In a process for the removal of acidic components, said acidic components being selected from the group consisting of $H_2S$, $CO_2$, $SO_2$, $SO_3$, $CS_2$, HCN, HCl, COS, and the oxygen and sulfur derivatives of $C_1$ to $C_4$ hydrocarbons from gases, which comprises contacting said gas with an aqueous solution comprising a basic salt, selected from the group consisting of potassium carbonate, sodium carbonate, potassium hydroxide and sodium hydroxide, the improvement comprising contacting said gas and said solution in the presence of an amine selected from the group consisting of 2-methylaminoethanol, 2-ethylaminoethanol, morpholine, and pyrrolidine.

2. The process of claim 1 wherein said acid gases are selected from the group consisting of $CO_2$ and COS.

3. The process of claim 1 wherein said basic salt comprises from about 5 to 40% by weight of said solution.

4. The process of claim 1 wherein said amine comprises from about 0.5 to 20% by weight of said solution.

5. The process of claim 1 wherein said contacting takes place at a temperature of from about 20° to 200°C and a 2,000 of from about 5 to 2000 psi.

6. The process of claim 1 wherein said salt is $K_2CO_3$.

7. The process of claim 6 wherein said solution is from about 10 to 35% by weight $K_2CO_3$ and from about 1 to 5 wt. % amine.

8. The process of claim 7 wherein said solution further comprises from about 0.5 to 10 wt. % of a hydration catalyst selected from the group consisting of As(OH)₃, Ge(OH)₄, HOCl, $H_3BO_3$, $H_2SO_3$ and HCHO.

9. The process of claim 7 wherein said solution further comprises boric acid in a ratio of 0.5 to 5.0 moles boric acid/mole amine.

* * * * *

UNITED STATES PATENT OFFICE
CERTIFICATE OF CORRECTION

Patent No. 3,856,921     Dated Dec. 24, 1974

Inventor(s) Adam L. Shrier et al.

It is certified that error appears in the above-identified patent and that said Letters Patent are hereby corrected as shown below:

Title page, item [73] should read

-- Assignee: Peter V. Danckwerts, Cambridge, England and Exxon Research and Engineering Company, Linden, N. J., part interest to each --.

Signed and Sealed this

Twelfth Day of April 1977

[SEAL]

Attest:

RUTH C. MASON
*Attesting Officer*

C. MARSHALL DANN
*Commissioner of Patents and Trademarks*